(12) United States Patent
Ogura

(10) Patent No.: US 7,530,287 B2
(45) Date of Patent: May 12, 2009

(54) INDUSTRIAL ROBOT

(75) Inventor: Katsuhito Ogura, Shizuoka-ken (JP)

(73) Assignee: Toshiba Kikai Kabushiki Kaisha, Tokyo (JP)

(*) Notice: Subject to any disclaimer, the term of this patent is extended or adjusted under 35 U.S.C. 154(b) by 489 days.

(21) Appl. No.: 11/282,666

(22) Filed: Nov. 21, 2005

(65) Prior Publication Data

US 2006/0182565 A1    Aug. 17, 2006

(30) Foreign Application Priority Data

Nov. 24, 2004    (JP) ............................. 2004-338682

(51) Int. Cl.
B25J 17/00    (2006.01)

(52) U.S. Cl. .............. 74/490.01; 74/490.04; 74/490.05; 74/490.08; 414/744.3; 901/15; 901/21; 901/49

(58) Field of Classification Search .............. 74/490.01, 74/490.02, 490.03, 490.04, 490.05, 490.07, 74/490.08; 414/744.3; 901/15, 21, 49
See application file for complete search history.

(56) References Cited

U.S. PATENT DOCUMENTS

| 5,054,332 | A | * | 10/1991 | Terauchi et al. | ........... | 74/490.04 |
| 5,271,292 | A | * | 12/1993 | Sawada et al. | ........... | 74/490.04 |
| 5,314,293 | A | * | 5/1994 | Carlisle et al. | ........... | 414/744.5 |
| 5,577,414 | A | * | 11/1996 | Ogawa et al. | ............ | 74/490.03 |
| 5,881,603 | A | * | 3/1999 | Kitamura | ................... | 74/490.03 |
| 6,099,238 | A | * | 8/2000 | Tsubota | .................... | 414/744.5 |
| 6,478,531 | B1 | * | 11/2002 | Yang | ........................ | 414/744.3 |
| 7,300,240 | B2 | * | 11/2007 | Brogardh | .................... | 414/680 |

| 2006/0156850 | A1 | * | 7/2006 | Mueller | ................... | 74/490.01 |

FOREIGN PATENT DOCUMENTS

| JP | 03-026477 | 2/1991 |
| JP | 04-256596 | 9/1992 |
| JP | 04315593 A | * 11/1992 |
| JP | 7-017485 | 3/1995 |
| JP | 7-040085 | 7/1995 |

(Continued)

OTHER PUBLICATIONS

Japanese Office Action issued in Application No. 2004-338682 mailed Apr. 1, 2008.

(Continued)

*Primary Examiner*—Phillip Johnson
(74) *Attorney, Agent, or Firm*—DLA Piper LLP (US)

(57) ABSTRACT

An industrial robot able to reliably prevent fall of an elevating part and able to improve a degree of freedom of design, that is, an industrial robot comprising a base body; an elevating part able to rise and descend with respect to the base body; an elevation drive source; a transmission mechanism for transmitting the drive force of the elevation drive source; a drive mechanism for making the elevating part rise and descend by the drive force transmitted via the transmission mechanism; a sensor for detecting an abnormality of the transmission of the drive force from the drive source to the elevating part; and a fall prevention part supported by one of the base body and the elevating part and abutting against the other of the base body and the elevating part and preventing fall of the elevating part when the sensor detects an abnormality of the transmission mechanism.

2 Claims, 4 Drawing Sheets

FOREIGN PATENT DOCUMENTS

| | | |
|---|---|---|
| JP | 10-58374 | 3/1998 |
| JP | 2002-036164 | 5/2002 |

OTHER PUBLICATIONS

English translation of Japanese Office Action issued in Application No. 2004-338682 mailed Apr. 1, 2008.

English Language Abstract of JP 03-026477.
English Language Abstract JP 10-058374.
Machine translation of JP 10-058374.
English Language summary of JP 7-017485.
English Language Abstract JP 04-256596.
English Language Abstract JP 7-40085.

* cited by examiner

INDUSTRIAL ROBOT

BACKGROUND OF THE INVENTION

1. Field of Invention

The present invention relates to an industrial robot, more specifically relates to an industrial robot having an elevating part elevating and lowering a workpiece.

2. Description of the Related Art

In an industrial robot in which the robot body is driven to be elevated or lowered, when the drive system etc. driving the elevating and lowering operation breaks down, the weight of the robot body itself will sometimes cause the robot body to fall. For example, in an industrial robot transmitting the drive force of a motor by a pulley and a belt hung upon the pulley so as to drive the elevation and lowering operation the robot body, if a power outage etc. occurs during the work, the brake of the motor will maintain the position of the robot body, but if the belt breaks, a part breaks, etc. and power of the motor can no longer be transmitted at all, the robot body will fall.

As a technique for solving such a problem, there is the fall prevention system disclosed in Japanese Patent Publication (Kokai) No. 2002-36164-A. In this fall prevention system, rotation of a drive pulley is transmitted to a driven pulley by a belt. The rotation of the driven pulley is converted to drive force in the vertical direction and used for elevation of the elevation member. The outer circumference of the driven pulley is provided with a stopper for engaging with the driven pulley and stopping the rotation of the driven pulley in accordance with slack or breakage of the belt so as to prevent the elevation member from fall.

In the technique of Japanese Patent Publication (Kokai) No. 2002-36164-A, however, a stopper is engaged with the driven pulley to prevent fall, therefore various inconveniences occur. For example, it is necessary to provide the stopper and a drive mechanism thereof adjacent at the driven pulley, so the degree of freedom in layout is low. Further, if a breakdown has occurred in a portion from the driven pulley to the elevating part, even if the rotation of the driven pulley is stopped, the elevation member cannot be prevented from fall.

SUMMARY OF THE INVENTION

It is therefore desirable to provide an industrial robot able to more reliably prevent fall of an elevating part and able to improve the degree of freedom of design.

According to the present invention, there is provided an industrial robot comprising a base body; an elevating part able to rise and descend with respect to the base body; an elevation drive source; a transmission mechanism for transmitting the drive force of the elevation drive source; a drive mechanism for making the elevating part rise and descend by the drive force transmitted via the transmission mechanism; a sensor for detecting an abnormality of the transmission of the drive force from the drive source to the elevating part; and a fall prevention part supported by one of the base body and the elevating part and abutting against the other of the base body and the elevating part and preventing fall of the elevating part when the sensor detects an abnormality of the transmission mechanism.

Preferably, the fall prevention part is engaged with the other of the base body and the elevating part to prevent fall of the elevating part.

Preferably, the one of the base body and the elevating part is the base body, the other of the base body and the elevating part is the elevating part, the elevating part is provided with a body part and an engagement and movement part provided fixed to the body part and moving in a certain direction along with the rise and descent of the body part, the engagement and movement part is provided with a plurality of engagement parts arranged in a certain direction, and the fall prevention part moves from outside the orbits of the plurality of engagement parts to the inside of the orbits to engage with one of the plurality of engagement parts.

Preferably, the engagement and movement part is provided with a shaft part extending in the vertical direction and the plurality of engagement parts arranged along the shaft part and projecting from the shaft part, and the engagement part is provided with a surface projecting from the shaft part while being inclined with respect to the vertical direction and a surface provided beneath the inclined surface and perpendicular with respect to the vertical direction.

Preferably, the elevating part rises and descends with respect to the base body by reciprocating movement that a center of rotation thereof is at a position closer to the base body in the elevating part, the engagement and movement part is provided around the center of rotation, and the engagement parts are arranged in circumference around the center of rotation.

Preferably, the fall prevention part prevents the fall of the elevating part by a frictional force with the other of the elevating part and the base body.

Preferably, provision is further made of a fall prevention drive source different from the elevation drive source for driving the fall prevention part.

Preferably, a drive source of the fall prevention part is supplied with electric power for the drive operation, and the fall prevention part is held at a position for preventing the fall of the elevating part when electric power is not supplied to the drive source of the fall prevention part.

Preferably, the sensor detects an abnormality of the transmission mechanism.

According to the present invention, fall of the elevating part can be more reliably prevented, and the degree of freedom in design can be improved.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

First Embodiment

Figure 1:
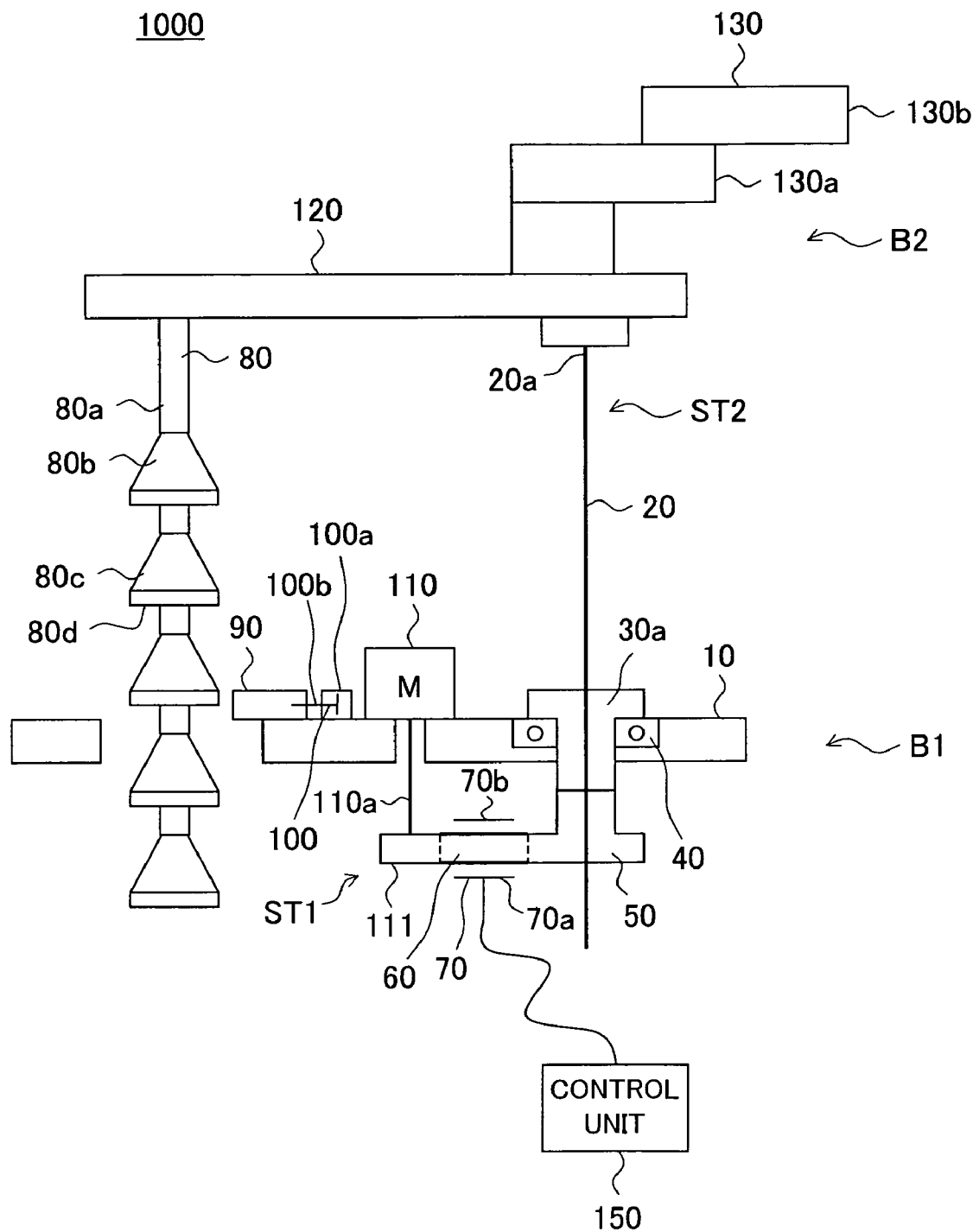
FIG. 1 is a diagram showing the overall constitution of an industrial robot according to a first embodiment of the present invention.

FIG. 1 is a schematic diagram showing the constitution of an industrial robot 1000 according to a first embodiment of the present invention. The industrial robot is provided with a base body B1, an elevating part B2 able to rise and descend with respect to the base body B1, and a control unit 150 for executing various processing such as control of the elevation operation of the elevating part B2.

The base body B1 is provided with a body frame 10 and, for making the elevating part B1 rise and descend with respect to the body frame 10, is provided with a drive source constituted by a motor 110, a transmission mechanism ST1 for transmitting the drive force of the motor 110, and a drive mechanism ST2 for driving the elevating part B2 upward or downward by the drive force transmitted via the transmission mechanism ST1.

The body frame 10 is constituted by for example a metal and has a strength capable of supporting the elevating part B2. The body frame 10 may be provided while being fixed to a floor surface etc. or may be provided moveably.

The motor 110 is provided fixed to the body frame 10 and is constituted by for example a stepping motor or servo motor or other electric motor. The motor 110 is controlled by the control unit 150 via a not shown motor drive portion and makes an output shaft 110a rotate forward or in reverse to any rotation position.

The transmission mechanism ST1 is provided with a drive pulley 111 fixed to the output shaft 110a of the motor 110 and rotating integrally with the output shaft 110a, a timing belt 60 hung on the drive pulley 111, and a driven pulley 50 upon which the belt 60 is hung and to which rotation of the drive pulley 111 is transmitted via the belt 60. Note that a deceleration ratio or an acceleration ratio of the driven pulley 50 with respect to the drive pulley 111 may be suitably set.

The drive mechanism ST2 converts the drive force of the rotation of the driven pulley 50 to drive force in the vertical direction and transmits it to the elevating part B2. The drive mechanism ST2 is provided with for example a ball nut 30 rotating integrally with the driven pulley 50 and a ball screw 20 fitted in a female screw portion 30a of the ball nut 30 and driven in an axial direction by the rotation of the ball nut 30. The ball nut 30 is rotatably provided at the body frame 10 via a bearing 40 provided on the periphery. The ball screw 20 extends in the vertical direction. An upper end 20a is fixed to the elevating part B2.

The elevating part B2 is provided with a sub frame 120 and a hand 130 provided at the sub frame 120. The sub frame 120 is fixed to the upper end 20a of the ball screw 20 and rises and descends by the vertical movement of the ball screw 20. The hand 130 is constituted as a robot portion for performing various work and is configured in accordance with the target work. The work performed by the hand 130 include for example assembly of parts and cutting and joining materials. FIG. 1 shows an example in which the hand 130 has arm 130a and 130b moveable with respect to the sub frame 120.

The control unit 150 is constituted by for example a computer including a CPU, ROM, RAM, and storage device. By reading a program stored in the ROM and executing it by the CPU, a means for executing various processing is constructed.

The industrial robot 1000 having the above constitution is, for preventing the fall of the elevating part B2, further provided with a sensor 70, an engagement and movement part constituted by a stopper shaft 80, a fall prevention part constituted by a stopper plate 90, and a fall prevention drive source constituted by a cylinder 100. When the sensor 70 detects an abnormality of the transmission mechanism ST1, the cylinder 100 drives the stopper plate 90, and the stopper plate 90 stops the stopper shaft 80 fixed to the elevating part B2 and prevents fall of the elevating part B2. Below, details will be explained.

The sensor 70 monitors the state of transmission of the drive force from the motor 110 to the elevating part B2 and outputs the monitoring result as an electric signal to the control unit 150. The state of transmission of the drive force is monitored by monitoring for example the state of suspension of the belt 60. The sensor 70 is constituted by for example a reflection type photoelectric sensor provided with a light projecting and receiving part 70a emitting predetermined light and receiving the light and a reflecting part 70b arranged at a position facing the light projecting and receiving part 70a across the belt 60 and able to reflect the light from the light projecting and receiving part 70a toward the light projecting and receiving part 70a. When the belt 60 is normally hung between pulleys, the light emitted from the light projecting and receiving part 70a is interrupted by the belt 60, so the amount of light received by the light projecting and receiving part 70a is lower than a threshold value. When the belt 60 becomes slack or breaks etc. and the amount of light received by the light projecting and receiving part 70a exceeds the threshold value, the light projecting and receiving part 70a outputs an ON signal to the control unit 150. Due to this, an abnormality of the hung state of the belt is detected.

The stopper shaft 80 is provided with a shaft part 80a extending in the vertical direction and a plurality of engagement parts 80b provided along the shaft part 80a. The shaft part 80a is provided fixed to the sub frame 120, so the stopper shaft 80 moves in the vertical direction integrally with the sub frame 120. Each engagement part 80b is formed as a conical shape centered about the axis of the shaft part 80a and with the vertex at the top. For example, it is formed as a triangular pyramid or a cone.

The stopper plate 90 is supported at the base body B1 at a position adjacent to the stopper shaft 80 and provided moveably substantially in a horizontal direction between a position at which it is inserted between the engagement parts 80b and a position at which it is retracted from the space between the engagement parts 80b. In other words, the stopper plate 90 is provided moveably from the outside of the orbit of the engagement parts 80b to the inside of the orbit. The stopper plate 90 is constituted by for example a metal, has a strength capable of supporting the elevating part B1, and is supported by the body frame 10 so that it can support the elevating part B1 via the stopper shaft 80.

The cylinder 100 is constituted by an air cylinder controlled in drive by air pressure. The cylinder 100 is provided with a cylinder part 100a fixed to the body frame 10 and an output shaft 100b reciprocally moving in the shaft direction with respect to the cylinder part 100a by control of the air pressure in the cylinder part 100a. The output shaft 100b is provided with the stopper plate 90. The output shaft 100b is pushed outward by the cylinder part 100a so as to push the stopper plate 90 outward toward the stopper shaft 80.

The air pressure in the cylinder part 100 is controlled by a not shown solenoid valve (electromagnetic valve). The solenoid valve is controlled by the control unit 150. The solenoid valve is constituted by for example a one-side solenoid valve and constituted so as to be driven to the side of pushing the stopper plate 90 outward when the power of the solenoid valve is cut off. For example, it is constituted so that the output shaft 100b is pushed outward by movement of a spool of the solenoid valve by a spring force when the power is off and the air in the cylinder part 100a is drained by the movement.

Figure 2:
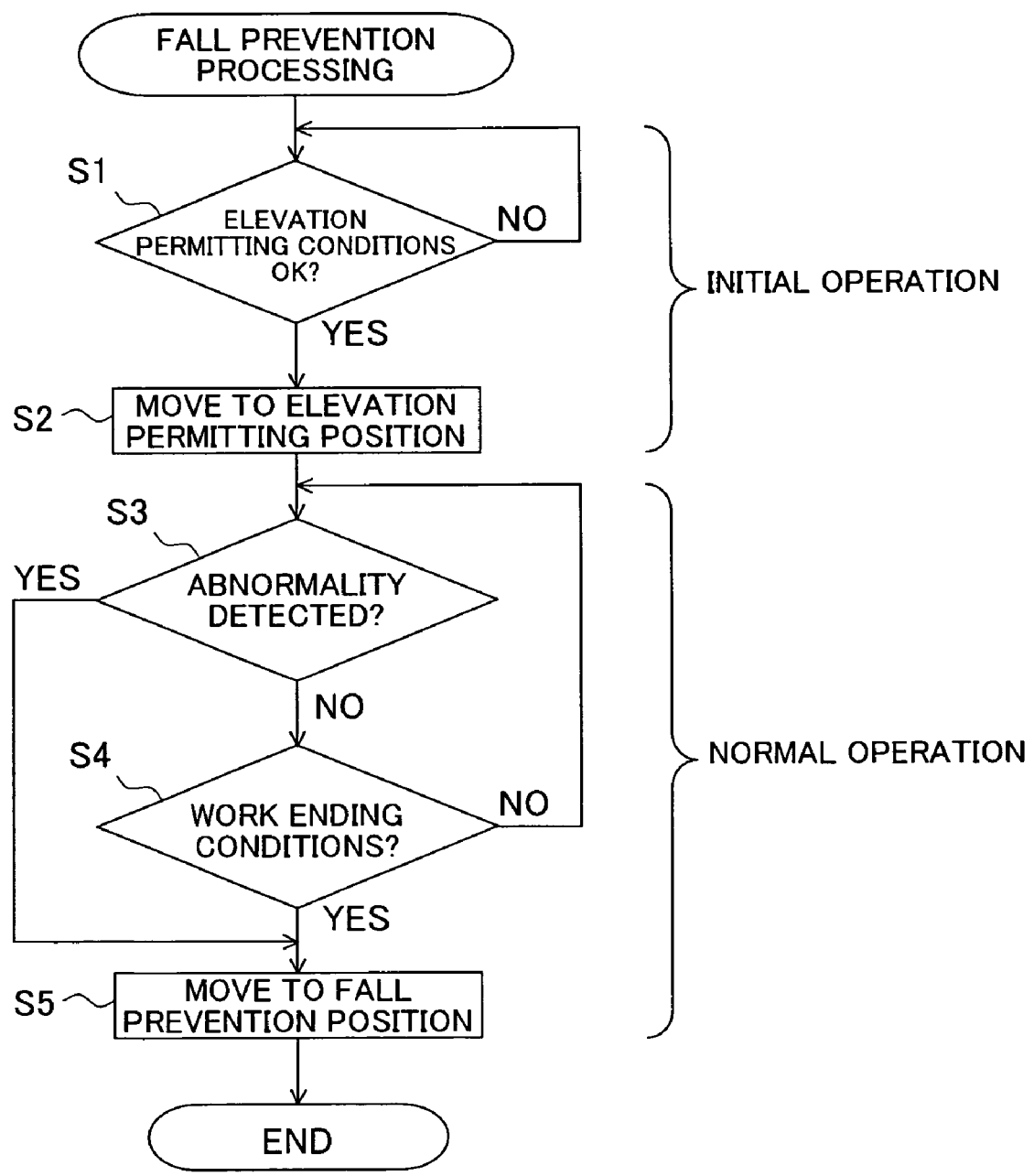
FIG. 2 is a flowchart showing a routine for processing for preventing fall executed by a control unit of the industrial robot of FIG. 1.

Next, the processing for preventing fall executed by the control unit 150 in order to prevent the fall of the elevating part B2 in the industrial robot 1000 having the above constitution will be explained. FIG. 2 is a flow chart showing a routine of the processing for preventing fall started when for example the power of the industrial robot 1000 is turned on. The processing includes processing of an initialization operation comprised of steps ST1 and ST2 and processing of normal operation comprised of steps S3 to S5.

Note that, before the start of this processing, the stopper plate 90 is in a state where it is pushed outward up to the position where the stopper plate 90 can be engaged with the stopper shaft 80.

First, the control unit 150 judges whether or not elevation permitting conditions are satisfied (step ST1) and stands by until the elevation permitting conditions are satisfied. The elevation permitting conditions are conditions for judging whether or not the elevating part B2 may be in an elevatable state. For example, the state of suspension of the belt 60 as determined based on the signal from the sensor 70 being normal and a predetermined input operation for permitting the elevation being carried out by a worker can be set as the elevation permitting conditions.

When it is judged that the elevation permitting conditions are satisfied, a control signal is output to the cylinder 100 so that the stopper plate 90 is made to retract from the position where it can be engaged with the stopper shaft 80 (step S2). Due to this, the elevating part B2 becomes able to rise and descend and the industrial robot 1000 can perform various work.

Thereafter, the control unit 150 judges whether or not an abnormality of the belt 60 was detected based on the signal from the sensor 70 (step S3).

When it is judged that no abnormality is detected, it is judged whether or not conditions for ending the work in the industrial robot 1000 are satisfied (step S4). The work ending conditions are conditions for judging the end of the work, in other words, conditions for judging whether or not rising and descent of the elevating part can be prohibited when no abnormality occurs. For example, a predetermined input operation for informing the end of the work being performed by a worker or the industrial robot 1000 not carrying out work for a constant time can be set as the work ending conditions. When it is judged that the work ending conditions are not satisfied, the routine returns to step S3.

When it is judged at step S3 that an abnormality is detected or when it is judged at step S4 that the work ending conditions are satisfied, a control signal is output to the cylinder 100 so that the stopper plate 90 is made to move to a position where it is engaged with the stopper shaft 80 (step S5). Due to this, the fall of the elevating part B2 is prevented.

Note that the drive conditions of the stopper plate 90 may be made different between the time when an abnormality is detected at step S3 and the time when the work ending conditions are satisfied at step S4. For example, the movement of the stopper plate 90 at the time of the end of the work may be made gentler in comparison with the movement when an abnormality is detected so as to reduce the load on the cylinder 100.

When an abnormality is detected, various processing may be executed so as to inform the outside that an abnormality has occurred and the content of the abnormality, for example, inform the same to a worker or another industrial robot. For example, an alarm may be issued, a lamp lit, or an electric signal output for informing the abnormality to another robot. Further, the operation of the entire industrial robot may be stopped when an abnormality is detected. For example, the operation of the hand 130 may be stopped.

Note that, in the first embodiment, a plurality of conical engagement parts 80b are provided at the stopper shaft 80. Therefore, even if the belt 60 breaks or the like and the stopper plate 90 is pushed outward to the stopper shaft 80 during the fall, the stopper plate 90 is smoothly guided to the axial center direction of the stopper shaft 80 by the inclined surface (surface inclined with respect to the vertical direction) 80c of the engagement part 80b and reliably engaged with a bottom portion (surface perpendicular with respect to the vertical direction) 80d of the next engagement part 80b.

Second Embodiment

An industrial robot 2000 of the second embodiment has the same constitution as that of the first embodiment. Namely, it is provided with a base body B1, an elevating part B2, a motor 110, a transmission mechanism ST1, a drive mechanism ST2, and a sensor 70 as shown in FIG. 1. Further, in the same way as the first embodiment, it executes the fall prevention processing shown in FIG. 2. Below, an explanation will be given of only the portions different from the first embodiment.

Figures 3A, 3B:
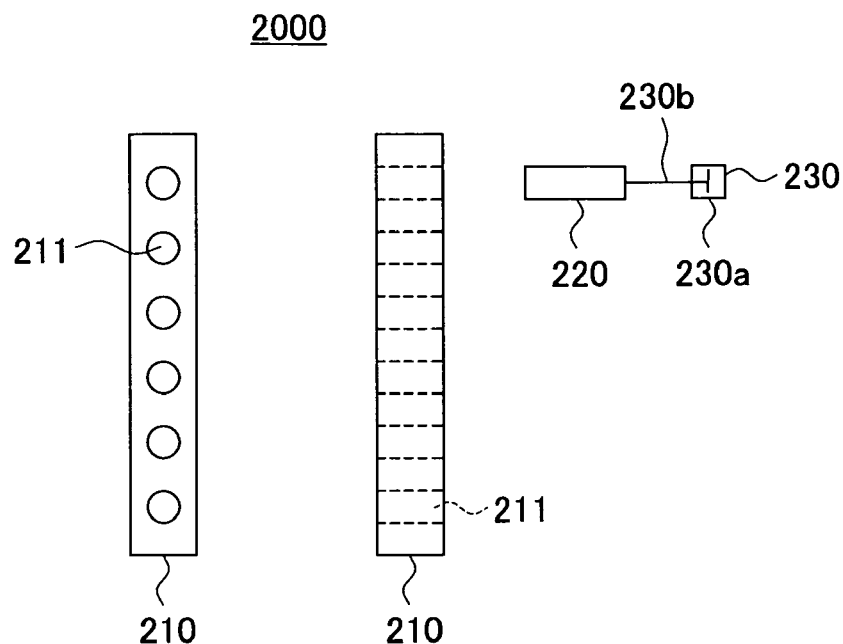
FIGS. 3A and 3B are diagrams showing portions of the industrial robot different from the first embodiment according to a second embodiment of the present invention.

FIGS. 3A and 3B are diagrams showing the portions different from the first embodiment, in which FIG. 3A is a front view, and FIG. 3B is a side view. The second embodiment is provided with a plate 210 as the engagement and movement part and a stopper pin 220 as a fall prevention part.

The plate 210 is fixed to the sub frame 120 of the elevating part B2, so moves in the vertical direction along with the operation of the elevating part B2 in the same way as the stopper shaft 80 of the first embodiment. The plate 210 is constituted by a long member which is long in the vertical direction and a plurality of holes 211 as engagement parts arranged in the vertical direction. The holes 211 are formed passing through the plate in the horizontal direction. Note that in place of the holes 211, recesses not passing through the plate may also be provided.

The stopper pin 220 is formed to a size able to be inserted into the holes 211. Further, the stopper pin 220 is fixed to the output shaft 230b of the cylinder 230 and provided moveably between a position where it is inserted into a hole 211 and a position where it is retracted.

The cylinder 230 has the same constitution as that of the cylinder 100 of the first embodiment and is supported on the body frame 10 of the base body B1 in the same way as the cylinder 100. Then, in the same way as the first embodiment, it is controlled in drive by the fall prevention processing of the control unit 150.

In the second embodiment having the above constitution, in the case where an abnormality occurs in the transmission mechanism ST1 and so on, the drive operation of the cylinder 230 causes the stopper pin 220 to be inserted into a hole 211 of the plate 210 and prevent fall of the elevating part B2. A plurality of holes 211 are provided, therefore, even when a hole 211 and the stopper pin 220 are off in position, the fall of the plate 210 causes the stopper pin 220 to be inserted into the next hole 211, so the fall of the elevating part B2 is reliably prevented.

Third Embodiment

An industrial robot 3000 of the third embodiment has the same constitution as that of the first embodiment. Namely, it is provided with a base body B1, an elevating part B2, a motor 110, a transmission mechanism ST1, a drive mechanism ST2, and a sensor 70 as shown in FIG. 1. Further, in the same way as the first embodiment, it executes the fall prevention processing shown in FIG. 2. Below, an explanation will be given of only the portions different from the first embodiment.

Figure 4:
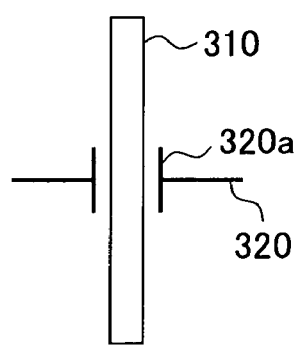
FIG. 4 is a diagram showing portions of the industrial robot different from the first embodiment according to a third embodiment of the present invention.

FIG. 4 is a diagram showing portions different from the first embodiment. The third embodiment is provided with a stopper shaft 310 as the engagement and movement part and a friction brake 320 as the fall prevention part.

The stopper shaft 310 is fixed to the sub frame 120 of the elevating part B2 in the same way as the stopper shaft 80 of the first embodiment, so moves in the vertical direction along with the rising and descent of the elevating part B2. The stopper shaft 310 is constituted by a long member long in the vertical direction. Note that the stopper shaft 310 is desirably constituted by a material and surface having a large friction coefficient.

The friction brake 320 has a pad 320a. As the pad 320a, use may be made of a known appropriate material. The pad 320a is provided moveably between a position at which it abuts against the stopper shaft 310 and a position at which it is retracted and is driven by a not shown drive source. As the drive source of the pad 320a, an appropriate member may be used, but the pad may be driven by an air cylinder in the same way as the first embodiment.

In the third embodiment having the above constitution, when an abnormality occurs in the transmission mechanism ST1 etc., the pad 320a abuts against the stopper shaft 310 and the stopper shaft 310 is braked by the frictional force, so the fall of the elevating part B2 is prevented.

Fourth Embodiment

Figures 5A, 5B:
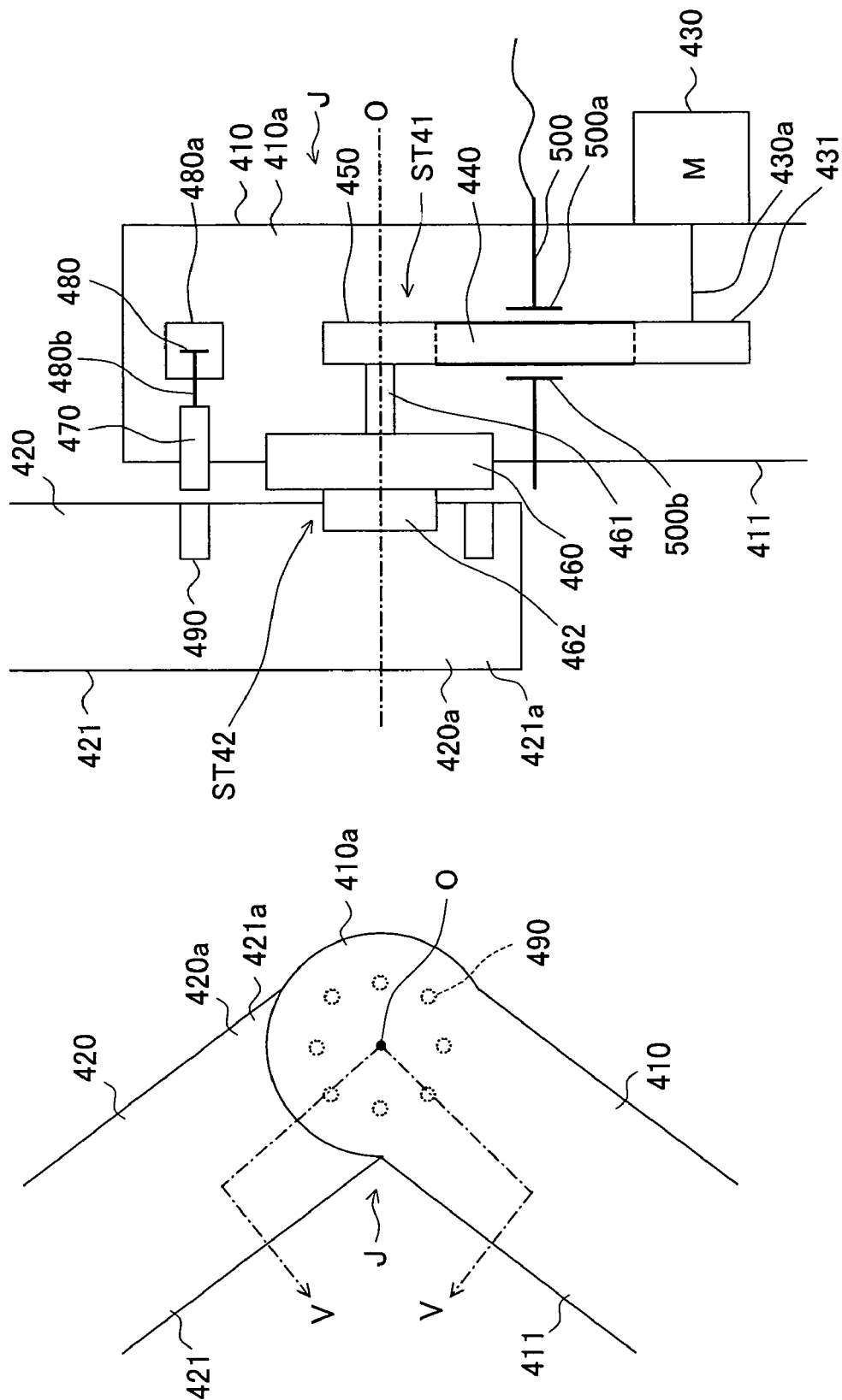
FIGS. 5A and 5B are diagrams showing principal parts of the industrial robot according to a fourth embodiment of the present invention.

FIGS. 5A and 5B are diagrams showing principal parts of an industrial robot 4000 according to a fourth embodiment, in which FIG. 5A is a side view, and FIG. 5B is a sectional view taken along a line V-V.

The industrial robot 4000 is provided with a first leg 410 as the base body and a second leg 420 as the elevating part. The first leg 410 and the second leg 420 are formed so that they are long in length in outer appearance. Their ends 410a and 420a are rotatably connected to each other to form a joint J, whereby the second leg 420 can reciprocally move (rise or descend) with respect to the first leg 410 using the joint J as a fulcrum. Note that, the first leg 410 may rise or descend with respect to the second leg 420 as well. Other than this, the industrial robot 4000 has a control unit for executing various processing such as control of the motor 430 in the same way as the first embodiment.

The first leg 410 is provided with a long hollow frame 411 defining the outer shape of the first leg 410 and is provided inside or outside the frame 411 with a motor 430 as the elevation drive source, a transmission mechanism ST41 for transmitting the drive force of the motor 430, and a drive mechanism ST42 for making the second leg 420 rise or descend by the drive force transmitted via the transmission mechanism ST41.

The frame 411 is constituted by for example a metal and has a strength capable of supporting the second leg 420. The frame 411 may be provided fixed to the floor surface etc. or may be provided moveably.

The motor 430 is provided fixed to the frame 411 and driven to rotate forward or in reverse to any rotation position by a not shown control unit in the same way as the motor 110 of the first embodiment. The transmission mechanism ST41 is provided with, in the same way as the transmission mechanism ST1 of the first embodiment, a drive pulley 431, a belt 440, and a driven pulley 450 and transmits the rotation of the output shaft 430a of the motor 430.

The drive mechanism ST42 transmits the drive force of the rotation of the driven pulley 450 using the joint J as a fulcrum to the second leg 420 as the drive force of the reciprocal movement of the second leg 420. The drive mechanism ST42 is provided with for example a shaft part 461 rotating integrally with the driven pulley 450, a decelerator 460 for transmitting the rotation of the shaft part 461 with a predetermined deceleration ratio, and a drive shaft 462 functioning as the output shaft of the decelerator 460 and fixed with respect to the second leg 420.

The second leg 420 is provided with a long frame 421 defining the outer shape of the second leg 420. The end of the second leg 420 opposite to the joint J (not shown) is provided with a device for performing various work.

The industrial robot 4000 having the above constitution is further provided with a sensor 500, a stopper pin 470 as the fall prevention part, and a cylinder 480 as the fall prevention drive source for preventing the fall of the second leg 420. Note that the end 421a (around the center of rotation O) of the frame 421 of the second leg 420 functions as the engagement and movement part. When an abnormality of the transmission mechanism ST1 is detected by the sensor 500, the stopper pin 470 is driven by the cylinder 480 and the rotation of the second leg 420 is stopped by the stopper pin 470 to thereby prevent the fall of the second leg 420. Details will be explained below.

The sensor 500 has the same constitution as that of the sensor 70 of the first embodiment. A light projecting and receiving part 500a and a reflecting part 500b are arranged facing each other across a belt 440.

The end 421a of the frame 421 of the second leg 420 is provided with a plurality of holes 490 arranged along the circumferential direction about the axis of rotation O of the second leg 420 on the surface facing the first leg 410. Note that the number and interval of the holes may be appropriately set.

The stopper pin 470 is formed to a size that can be inserted into the hole 490. It is provided at a position facing the orbit of the hole 490, can be moved between a position at which it is inserted into a hole 490 and a position at which it is retracted, and can support the load in the rotation direction due to the weight of the second leg 420 in the state where it is inserted in a hole 490.

The cylinder 480 has the same constitution as that of the cylinder 100 of the first embodiment. The output shaft 480b is provided with the stopper pin 470. By the cylinder part 480a pushing the output shaft 480b outward, the stopper pin 470 is pushed outward toward the second leg 420.

In the industrial robot 400 having the above constitution, the fall prevention processing of FIG. 2 is executed by the control unit in the same way as the first embodiment. When an abnormality occurs in the transmission mechanism ST1 and so on, the drive operation of the cylinder 480 causes the stopper pin 470 to be inserted into a hole 490 of the second leg 420 and prevent fall of the second leg 420. A plurality of holes 490 move on the same orbit, and the stopper pin 470 is inserted into the orbit. Therefore, even if a hole 490 and the stopper pin 470 are off in position, the stopper pin 470 is inserted into the next hole 490 due to the fall of the second leg 420, so the fall of the second leg 420 is reliably prevented.

According to the above embodiments, the fall prevention part can be provided at any position, and the degree of freedom of design is improved. Further, the fall prevention part supported on the base body directly abuts against the elevating part and prevents the fall, therefore fall is reliably prevented.

Further, the drive source for driving the elevating part and the drive source for driving the fall prevention part are set as different drive sources, therefore, even if an abnormality occurs in the drive source driving the elevating part, the fall prevention part is reliably driven and the fall of the elevating part can be reliably prevented.

The constitution is made so that when electric power is not supplied to the solenoid valve of the air cylinder, the fall prevention part is pushed outward to a position where it is engaged with the elevating part. Therefore, even if electric power is no longer supplied to the industrial robot due to a power outage or the like, the fall of the elevating part can be prevented.

The present invention is not limited to the above embodiments and can be executed in variable ways.

It is sufficient so long as the elevating part can rise and descent with respect to the base body. The constitutions and positional relationships of the elevating part and the base body are not critical. For example, the elevating part may be provided beneath of the base body, and the base body may move with respect to a fixed object such as the floor surface. Further, the elevation drive source, the transmission mechanism, the drive mechanism, the sensor, the fall prevention part, and the engagement and movement part may be provided at either of the base body or the elevating part.

It is sufficient so far as the transmission mechanism can transmit the drive force of the drive source to another mechanism. The invention is not limited to one able to transmit the drive force by a belt. For example, the drive force may be transmitted by gear trains meshed with each other or transmitted by a chain in place of a belt.

It is sufficient so far as the sensor can monitor the state of transmission of the drive force from the elevation drive source to the elevating part. The invention is not limited to one detecting an abnormality of the transmission mechanism. For example, the sensor may be one detecting an abnormality of the drive mechanism. The sensor may be one detecting coupling damage of the motor as well. In this case, it is possible to detect an abnormality by detection of a sharp drop of the motor torque etc. Further, the sensor may be one outputting an ON signal or OFF signal in accordance with a normal state or an abnormal state or may be one outputting a signal with a signal intensity in accordance with an amount of change of the monitoring target. The sensor may be a non-contact type sensor which does not contact the monitoring target such as a photoelectric sensor or ultrasonic wave sensor or a contact type sensor.

A drive source of the fall prevention part able to drive the fall prevention part to make it abut against the elevating part is sufficient. The invention is not limited to an air pressure device, but may be for example be a motor as well.

Whether or not an abnormality has occurred in the transmission of the drive force can be judged by appropriately defining the abnormal state. For example, a state where a drive force of a predetermined ratio or more in the drive force output by the drive source is not transmitted to the elevating part can be defined as the abnormal state. In this case, the predetermined ratio can be selected from variable viewpoints. It can be selected from viewpoints such as industrial practices, the type of industrial robot, whether or not elevation is possible or whether or not work is possible even when drive force is transmitted with only a predetermined ratio, and economical loss due to the lost drive force. Note that the state where the belt is broken is the state where no drive force output by the drive source is transmitted at all to the elevating part and is an example of the abnormal state.

It should be understood by those skilled in the art that various modifications, combinations, sub-combinations and alterations may occur depending on design requirements and other factors insofar as they are within the scope of the appended claims or the equivalents thereof.

What we claim is:

1. An industrial robot comprising:
   a first hollow frame;
   a second hollow frame, wherein the second frame is rotatably connected to the first frame around a rotation axis;
   a motor fixed to the first frame;
   a transmission mechanism connected to the motor, provided inside the first frame, and comprising:
     a drive pulley driven by the motor to rotate,
     a belt hung upon the drive pulley, and
     a driven pulley upon which the belt is hung and to which rotation of the drive pulley is transmitted via the belt;
   a drive mechanism for driving the second frame to rotate around the rotation axis by the drive force transmitted via the driven pulley;
   a sensor for detecting an abnormality of the transmission of the drive force from the motor to the second frame;
   a stopper pin supported by one of the first frame or the second frame, the stopper pin enabled to be inserted into a plurality of holes arranged in a circumference around the rotation axis on the other of the first frame or the second frame; and
   a drive source fixed to the one of the first frame or the second frame, the drive source driving the stopper pin towards the circumference to insert the stopper pin into any one of the plurality of holes to engage the first frame and. the second frame when the sensor detects an abnormality of the transmission of the drive force.

2. An industrial robot as set forth in claim 1, wherein the sensor comprises a photoelectric sensor, wherein the photoelectric sensor is shaded by the belt when the belt is hung upon and between the drive pulley and the driven pulley, and wherein the photoelectric sensor is partially shaded or unshaded by the belt when the belt is slackened and/or broken.

* * * * *